United States Patent [19]

Teraslinna

[11] Patent Number: 5,706,279
[45] Date of Patent: Jan. 6, 1998

[54] METHODS AND SYSTEMS FOR MANAGING PACKET FLOW INTO A FAST PACKET SWITCHING NETWORK

[75] Inventor: Kari Teraslinna, Boulder, Colo.

[73] Assignee: U S West Technologies, Inc., Boulder, Colo.

[21] Appl. No.: 801,543

[22] Filed: Feb. 18, 1997

Related U.S. Application Data

[63] Continuation of Ser. No. 410,243, Mar. 24, 1995, abandoned.

[51] Int. Cl.$^6$ .............................. H04L 12/26; H04L 12/56
[52] U.S. Cl. ........................ 370/232; 370/397; 370/412
[58] Field of Search ............................. 370/229, 230, 370/232, 233, 234, 252, 397, 409, 412; 395/200.06, 200.11, 200.13, 200.2, 250

[56] References Cited

U.S. PATENT DOCUMENTS

| | | | |
|---|---|---|---|
| 5,179,549 | 1/1993 | Joos et al. | 370/17 |
| 5,253,247 | 10/1993 | Hirose et al. | 370/14 |
| 5,267,232 | 11/1993 | Katsube et al. | 370/17 |
| 5,276,676 | 1/1994 | Horn et al. | 370/17 |
| 5,280,470 | 1/1994 | Buhrke et al. | 370/13 |
| 5,285,442 | 2/1994 | Iwamura et al. | 370/17 |
| 5,285,446 | 2/1994 | Yonehara | 370/60.1 |
| 5,303,233 | 4/1994 | Sugawara | 370/60 |
| 5,442,624 | 8/1995 | Bonomi et al. | 370/17 |

OTHER PUBLICATIONS

"The Asynchronous Transfer Mode: a tutorial", Jean–Yves Le Bloudec, Computer Networks and ISDN Sytems 24 (1992), pp. 279–309.

Paper on "Requirements for Phase 2 Signaling Protocol", ATM Forum Technical Committee Meeting; Jan. 17–20, 1994.

*Primary Examiner*—Hassan Kizou
*Attorney, Agent, or Firm*—Brooks & Kushman P.C.

[57] ABSTRACT

Methods and systems for controlling a flow of packets being forwarded by a customer premises equipment to an endpoint of a fast packet switching network having a plurality of virtual connections provisioned from the endpoint to a plurality of destination endpoints. A parameter indicative of bandwidth usage associated with the endpoint over at least two of the virtual connections is obtained. The flow of packets being forwarded to the endpoint is inhibited when the parameter violates a predetermined threshold.

16 Claims, 6 Drawing Sheets

METHODS AND SYSTEMS FOR MANAGING PACKET FLOW INTO A FAST PACKET SWITCHING NETWORK

This is a continuation of application Ser. No. 08/410,243 filed on Mar. 24, 1995, now abandoned.

TECHNICAL FIELD

The present invention relates generally to methods and systems for managing a flow of packets applied to an endpoint of a fast packet switching network.

BACKGROUND ART

Fast packet switching is an emerging multiplexing and switching technique used in cell relay services, such as the asynchronous transfer mode (ATM) technique, and frame relay services. Briefly, fast packet switching is a technique wherein a message is communicated between a source endpoint and a destination endpoint of a switching network using a series of information passing elements, i.e. packets, each of which contain both a payload field and an address field. The switching network used for connecting the two endpoints is composed of one or more fast packet switches with transmission facilities connecting the switches. Each of the fast packet switches contains a plurality of switch ports between which packets are communicated via a self-routing switching fabric. As a result, each of the switch ports can be employed either as a connection to an endpoint or as a connection to another fast packet switch in the network via the transmission facilities.

Each message to be communicated using fast packet switching is packetized by dividing the message into one or more pieces of information. Each of the pieces of information is loaded into the payload field of a corresponding packet. In a frame relay service, the packets are referred to as frames, and the length of the payload field is variable. In contrast, the length of the payload field is fixed in a cell relay service, wherein the packets are referred to as cells. Regardless of the type of packet employed, each of the packets is further loaded with an address field which contains information identifying a provisioned virtual connection between the two endpoints. Typically, the address field is contained in a header in the packet.

The packets are then forwarded to the switching network at the source endpoint for transmission to the destination endpoint. The switching network routes the packets to the destination endpoint based upon routing data in the fast packet switches. The routing data is written into the fast packet switches by a connection management processor at the time the virtual connection is provisioned. In particular, the routing data specifies how a packet is to be routed through the network based upon information contained within the address field of the packet.

Presently, a traffic contract for each virtual connection is negotiated, between a subscriber and a provisioning agent who represents the network, at the time of provisioning or subscription. The terms of the contract include a constraint on the amount of bandwidth which can be used by the subscriber on the virtual connection. The measure of the amount of bandwidth used a virtual connection can be based upon a measure of the mean bit rate, the peak bit rate, and/or the duration at which the peak rate is sustained, to name a few commonly-used parameters.

In accordance with the negotiated traffic contract, the connection management processor writes bandwidth parameters into the fast packet switches, wherein the bandwidth parameters are representative of bandwidth usage associated with each provisioned connection provided by the switch. Thereafter, each virtual connection is monitored within each switch for possible contract violations.

An example monitoring scheme utilizes what is referred to in the art as a "leaky bucket". A leaky bucket is a counter which is incremented upon an arrival of a packet, and is decremented periodically. If an incoming packet causes the counter to exceed a predetermined threshold, the contract is considered to be violated.

Regardless of the monitoring scheme employed, the network penalizes packets which violate the contract. For example, the network can discard the violating packets, or mark the violating packets with a low priority for loss. In this manner, the network can allocate bandwidth for the virtual connection and guarantee that the subscriber using the connection does not exceed the bandwidth parameters, which could result in interfering with other customers sharing bandwidth in the network.

Disadvantages of the present approach of associating a corresponding bandwidth constraint with each virtual connection become evident when implementing a virtual private network (VPN). A virtual private network is implemented for a plurality of subscribers by provisioning a plurality of permanent virtual connections such that each subscriber is permanently virtually connected to each other subscriber. If N subscribers are to be fully interconnected in a virtual private network, i.e. each subscriber is capable of transmitting information to each other subscriber, N(N−1) one-way virtual connections are required (one connection from each of N subscribers to the N−1 others). Since every connection has a corresponding cost commensurate with bandwidth allocated and associated therewith, the cost of implementing a virtual private network may be prohibitive for larger numbers of subscribers.

SUMMARY OF THE INVENTION

It is an object of the present invention to control a flow of packets forwarded to a fast packet switching network in accordance with a predetermined traffic contract.

In carrying out the above object and other objects, the present invention provides a method of controlling a flow of packets being forwarded by a customer premise equipment to an endpoint of a fast packet switching network. The fast packet switching network has a plurality of virtual connections provisioned from the endpoint to a plurality of destination endpoints, wherein the virtual connections are utilized for communicating the packets to the destination endpoints. The method includes a step of obtaining a parameter indicative of bandwidth usage associated with the endpoint over at least two of the virtual connections. The method further includes a step of inhibiting the flow of packets forwarded to the endpoint when the parameter violates a predetermined threshold.

Further in carrying out the above object and other objects, the present invention provides a system which performs the above-described steps for controlling a flow of packets being forwarded by a customer premise equipment to an endpoint of a fast packet switching network.

These and other features, aspects, and advantages of the present invention will become better understood with regard to the following description, appended claims, and accompanying drawings.

BEST MODE FOR CARRYING OUT THE INVENTION

Briefly, embodiments of the present invention overcome the above-described shortcomings of previous resource management methods and systems in that bandwidth is not associated with each virtual connection. Instead, bandwidth is associated with each source endpoint independent of the number of virtual connections emanating from the source endpoint to potential destination endpoints. As a result, the virtual connections to all of the potential destination endpoints are bundled together for the purpose of assigning and associating bandwidth. Consequently, the cost of implementing a virtual private network wherein N−1 virtual connections emanate from each source endpoint, and wherein each source transmits on one of the N−1 virtual connections at a time, can be reduced using embodiments of the present invention.

Figure 1:
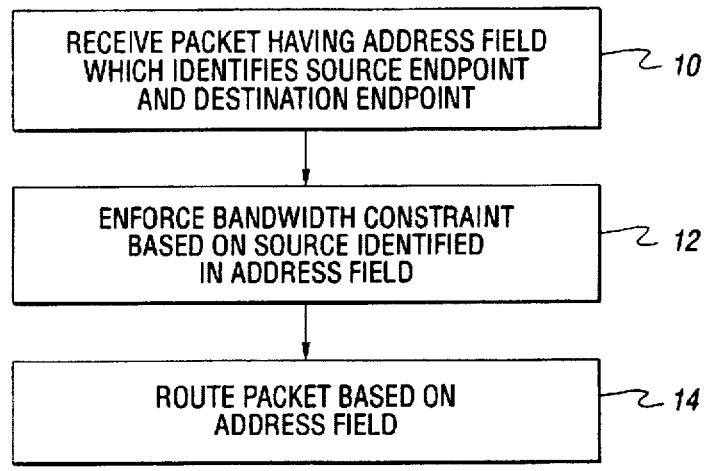
FIG. 1 is a flow chart of an embodiment of a method of resource management in a fast packet switching network.

FIG. 1 is a flow chart of an embodiment of a method of resource management in a fast packet switching network. The fast packet switching network, having a plurality of endpoints, includes at least one fast packet switch used in providing a virtual connection between at least one selected pair of the endpoints. The method includes a step of receiving a packet having an address field which identifies a source endpoint and a destination endpoint, as indicated by block 10. Typically, the step of receiving the packet is performed at a switch port in a fast packet switch within the network.

The address may identify, but need not identify a unique global address of the user at the source and destination endpoints such as a telephone number. In a preferred embodiment, the address identifies a hop or segment of a virtual connection in a network of fast packet switches. Translations in a fast packet switch may change the address in the packet for subsequent hops of the same virtual connection. In other words, the address locally identifies a virtual connection, and is uniquely associated with, and therefore indirectly identifies, the source and destination endpoints connected.

In one embodiment, the packet does not contain any unique label which directly identifies the source. The packet only contains a virtual connection identifier indirectly associating a source and destination pair. A lookup of the virtual connection identifier in a database or translation table can be used to directly identify a source. A number of virtual connections identifiers may have one source associated with them in the database if that source has virtual connections to many destinations.

Preferably, the address field contains a source label which identifies the source endpoint and a destination label which identifies the destination endpoint, although alternative embodiments of the present invention are not limited thereto. The source label and the destination label uniquely identify a source endpoint-destination endpoint pair, and thereby uniquely identify a unidirectional virtual connection between the pair.

Figure 2A:
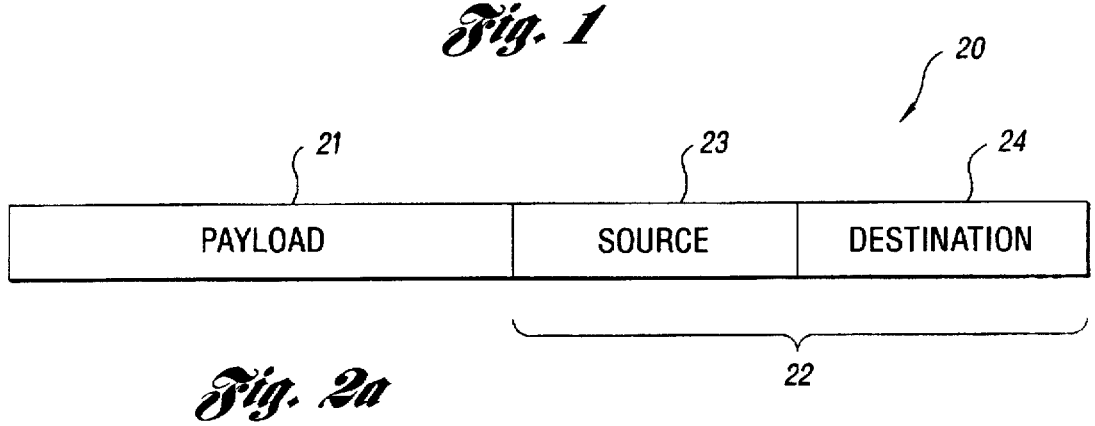
FIGS. 2a and 2b illustrate examples of packets having a protocol in accordance with the present invention.

An example of a packet 20 having a protocol in accordance with the present invention is illustrated in FIG. 2a. The packet 20 includes a payload field 21 and an address field 22. The address field 22 includes a source-associated part 23 and a destination-associated part 24. The address field 22 is contained within a header of the packet 20. Hereinafter, an address field in accordance with this protocol is referred to as a virtual connection identifier label (VCIL).

Figure 2B:
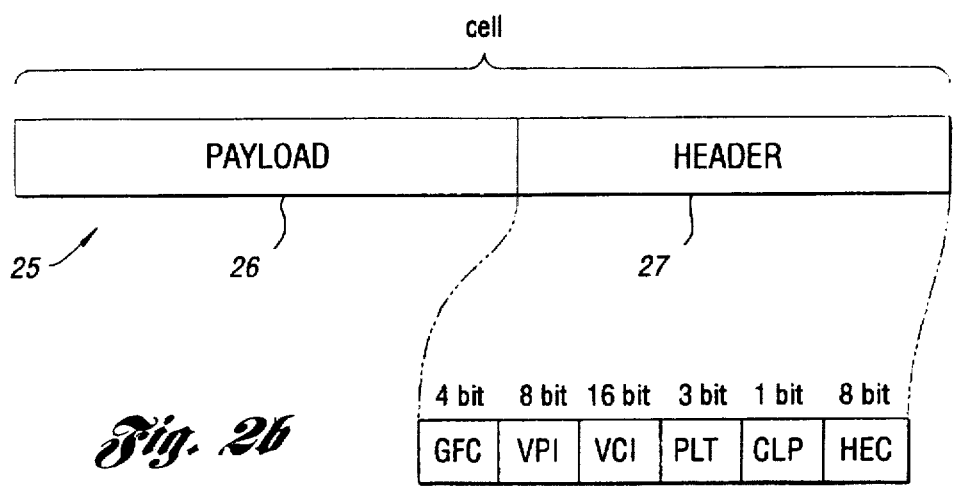

Another example of a packet having a protocol in accordance with the present invention is illustrated in FIG. 2b. Here, the packet comprises a fixed-length cell 25 based upon the ATM standard. The cell 25 includes a 48-octet payload field 26 and a 5-octet header 27. The header 27 includes the following fields: a generic flow control (GFC) field, a virtual path identifier (VPI) field, a virtual channel identifier (VCI) field, a payload information type (PT) field, a cell loss priority (CLP) field, and a header error control (HEC) field. In a preferred embodiment, the address field is comprised of the VPI field and the VCI field within the header. More preferably, the VPI field is used for identifying the source endpoint, and the VCI field is used for identifying the destination endpoint.

It is noted that the packet protocols illustrated in FIG. 2 are examples of many types of protocols which can be employed using embodiments of the present invention. In particular, the present invention can be applied to frames as well as cells. Further, the cells are not necessarily limited to the ATM standard.

Referring back to FIG. 1, the method further includes a step of enforcing a bandwidth constraint, as indicated by block 12, based upon the source endpoint identified by the address field, wherein the bandwidth constraint is independent of the destination endpoint identified by the address field. In a preferred embodiment wherein the address field contains a source label which identifies the source endpoint and a destination label which identifies the destination endpoint, the bandwidth constraint is enforced based upon the source label and is independent of the destination label.

In a second embodiment, only a virtual connection is identified. A database or translation table lookup identifies the source transmitting on that virtual connection. The bandwidth constraint is enforced based upon the source thus identified.

The bandwidth constraint is based upon at least one predefined measure of the bandwidth associated with the source identified by the address field. As previously mentioned, such measures of bandwidth include average bit rate and peak bit rate. If the bandwidth constraint for the source endpoint is violated by an incoming packet in accordance with a predetermined traffic contract, then the packet is penalized in a predetermined manner. As described earlier, the violating packet can be discarded or marked with a low priority for loss, for example.

Based upon whether or not the packet violates the bandwidth constraint and the type of penalty employed for violating packets, the method may further include a step of routing the packet based upon the address field, as indicated by block 14. Here, the packet is routed from the switch port at which the packet is received, through the switching fabric contained within the fast packet switch, to a second port for transmission toward the destination endpoint. As one with ordinary skill in the art will recognize, the destination endpoint may be located at a switch port on another fast packet switch connected to the second port via a transmission facility, and as such may not be directly interfaced to the second port.

In a preferred embodiment, wherein the address field contains a source label which identifies the source endpoint and a destination label which identifies the destination endpoint, the step of routing the packet is based upon both the source label and the destination label. An example of when the packet may not be routed through the switching fabric is when the packet is discarded in the step of enforcing the bandwidth constraint.

The method of FIG. 1 can be employed to provide bandwidth resource management in a communication network wherein a plurality of virtual connections are provisioned from a source endpoint to a plurality of potential destination endpoints, and wherein the desired destination endpoint identified by the address field of the received packet is included in the plurality of potential destination endpoints. It is noted that the address field need not explicitly identify the desired destination endpoint; for example, the address field may identify the virtual connection between the source endpoint and the desired destination endpoint. Here, the desired destination endpoint can be found from a database based upon the virtual connection identified by the address field.

The bandwidth constraint for the source endpoint is enforced by measuring the bandwidth usage associated with the source endpoint over all of the plurality of virtual connections. If the packet causes the violation of a predetermined bandwidth constraint, then the packet is penalized as described earlier. In this context, the plurality of virtual connections which emanate from the source endpoint can be considered as a bundle for the purpose of assigning bandwidth thereto and enforcing bandwidth constraints therefor.

Figure 3:
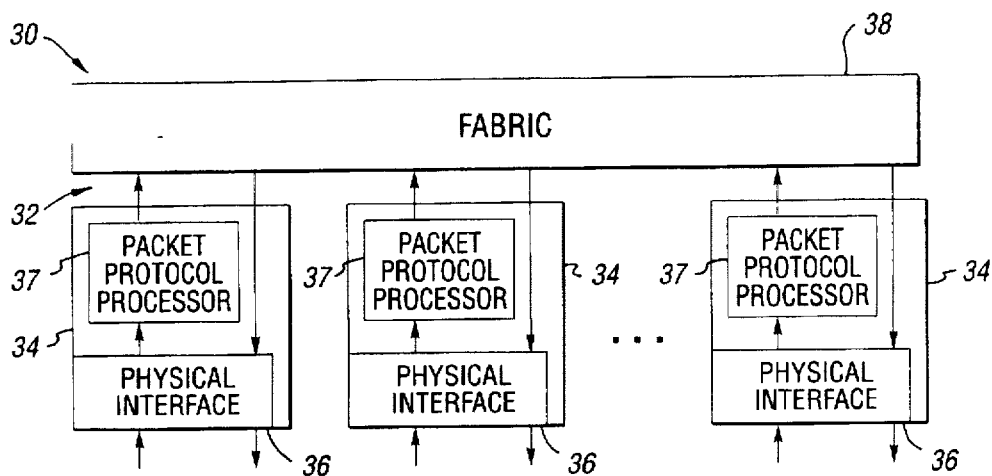
FIG. 3 is a block diagram of a fast packet switch having an embodiment of a system for bandwidth resource management in accordance with the present invention.

FIG. 3 is a block diagram of a fast packet switch 30 having an embodiment of a system for bandwidth resource management in accordance with the present invention. The fast packet switch 30 includes a plurality of switch ports 32, each of the switch ports 32 providing a port either to some type of subscriber equipment (for communication with the subscriber) or to a transmission facility (for communication with another switch in a network). It is noted that subscriber equipment refers generally to any type of equipment which a subscriber may employ at an endpoint of the network. Examples of subscriber equipment include, but are not limited to, phone equipment, a router or other datacom equipment, a private branch exchange (PBX), or an interface to another network.

Each of the switch ports 32 (or each transmission facility) has a line unit 34 associated therewith. Each line unit 34 performs two main functions: (i) it processes the physical layer protocol, and (ii) it processes the packet protocol. A physical interface 36 performs the physical layer protocol processing. As such, the physical interface 36 provides means for receiving and transmitting electrical signals representative of received and transmitted packets.

A packet protocol processor 37 performs the packet protocol processing. The packet protocol processor 37 provides means for enforcing a bandwidth constraint based upon an address field contained within the received packet. Consequently, the line unit 34 enforces a bandwidth constraint for packets communicated over a bundle of provisioned virtual connections emanating from a source endpoint identified by the address field. As described earlier, a received packet which violates the bandwidth constraint is penalized in a predetermined manner.

Based upon whether or not the received packet violates the bandwidth constraint, and the type of penalty employed for violating packets, the line unit 34 further provides the packet and a physical switch port address to a self-routing switching fabric 38. The fabric 38 delivers the packet to a selected one of the switch ports 32 identified by the physical switch port address. Once delivered to the selected switch port, the packet can be transmitted to another switch in the network or to equipment at a subscriber endpoint. The physical switch port address can be discarded at the selected output switch port.

Figure 4:
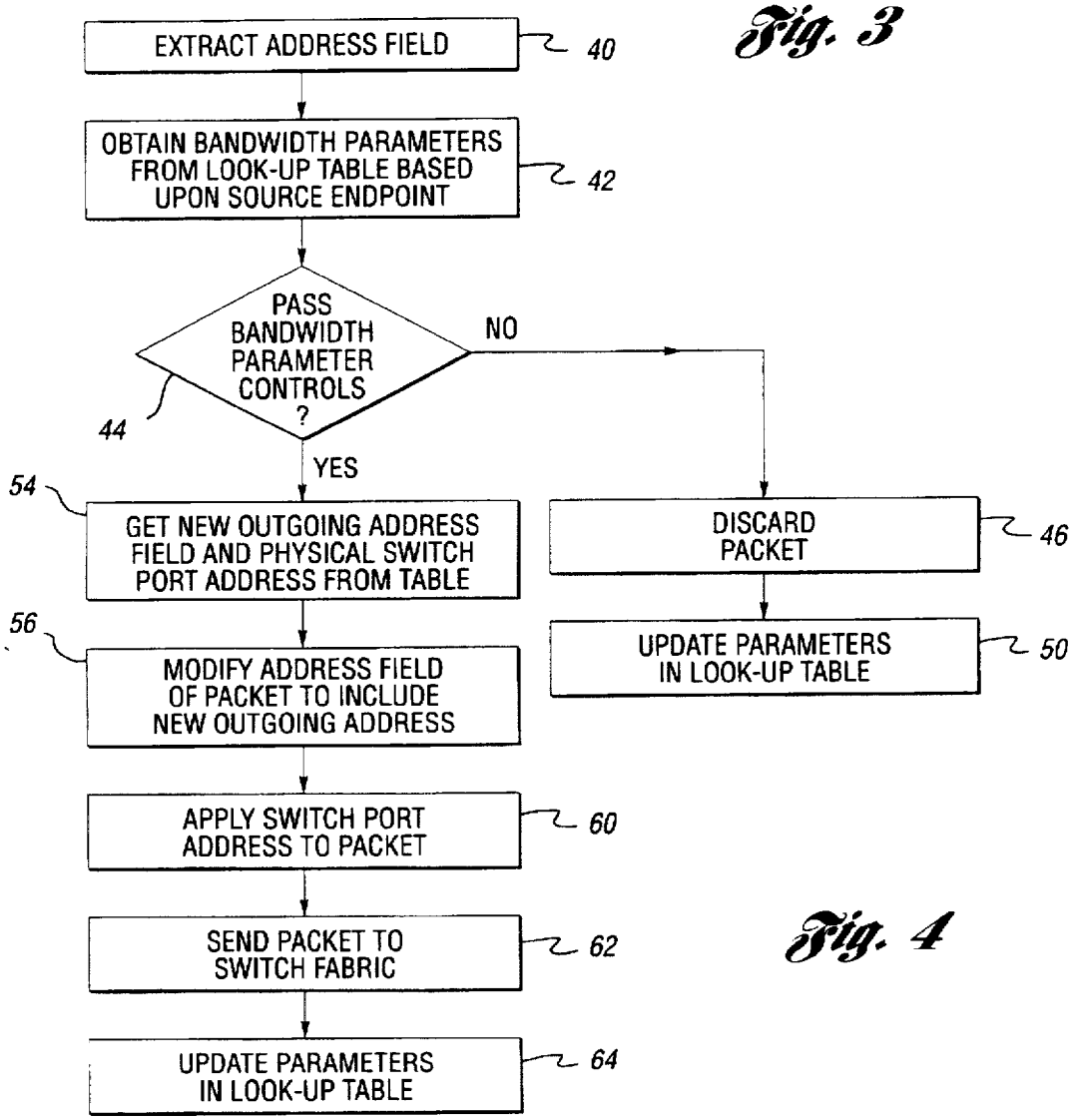
FIG. 4 is a flow chart of a method of processing a received packet for use with embodiments of the line unit in accordance with the present invention.

FIG. 4 is a flow chart of a method of processing a received packet for use with embodiments of the line unit in accordance with the present invention. Upon receiving the packet, the address field, typically located in a header in the packet, is extracted as indicated by block 40.

The bandwidth parameters associated with the source endpoint identified by the address field are obtained from a look-up table, as indicated by block 42. The bandwidth parameters provide measures of the bandwidth associated with a bundle of provisioned virtual connections emanating from the source endpoint.

As indicated by block 44, the bandwidth parameters for the source endpoint are examined for violations with respect to a predetermined traffic contract for the bundle of virtual connections emanating from the source endpoint. If at least one of the bandwidth parameters is in violation of the traffic contract, then the packet is discarded, as indicated by block 46, and the bandwidth parameters in the look-up table are updated accordingly, as indicated by block 50.

If the traffic contract is not violated, then a new outgoing address field and a physical switch port address are obtained by the look-up table, as indicated by block 54. Two embodiments of performing this step are described below.

In a first embodiment, the new outgoing address field and the physical switch port address are obtained from the look-up table in dependence upon a concatenated address comprising the source label and the destination label. This table look-up returns the physical switch port address and a full, new outgoing address field having a new source label and a new destination label.

In a second embodiment of a method of performing the step indicated by block 54, an intermediate pointer label is obtained from the look-up table in dependence upon the source label. The intermediate pointer label and the destination label are then concatenated. A second table look-up step is performed based upon the concatenated label. This returns the physical switch port address as well as a new outgoing address field.

As indicated by block 56, the method further includes a step of modifying the address field of the packet to include the new outgoing address. As indicated by block 60, the method includes a step of appending the physical switch port address to the front of the packet. The packet is then sent to the switch fabric, as indicated by block 62.

The switch fabric uses the physical switch port address to route the packet therethrough. Once the switch fabric is traversed, the port address is discarded. The packet can then be transmitted on a transmission facility to another switch in the network with the new outgoing address field in the packet header.

As indicated by block 64, a step of updating the bandwidth parameters in the look-up table is performed. The bandwidth parameters are updated according to the contribution of the current packet to the measurement of the average and peak bandwidth.

Figure 5:
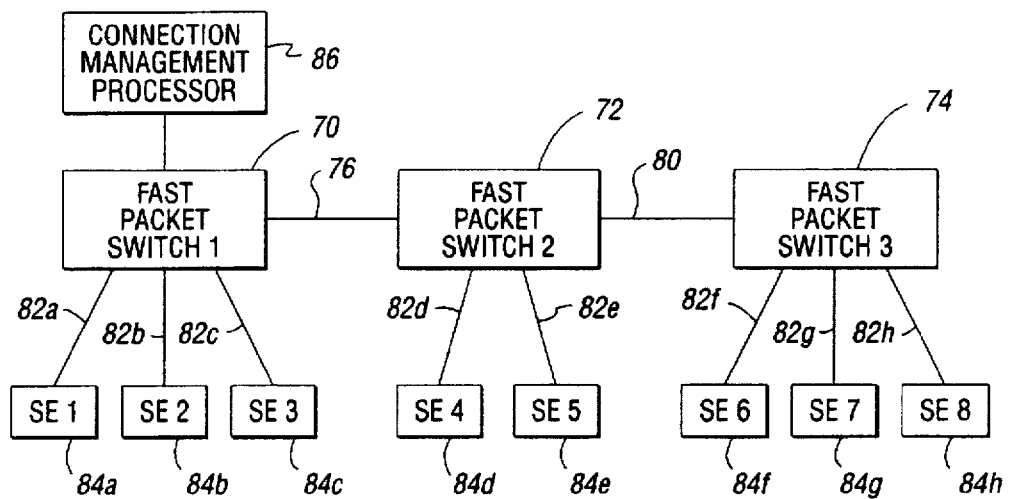
FIG. 5 is a block diagram of a communication network in accordance with embodiments of the present invention.

In order to illustrate the utilization of embodiments of the present invention and advantages which result therefrom, a block diagram of an example communication network in accordance with the present invention is given in FIG. 5. For the purpose of illustration, the network includes three representative fast packet switches 70, 72, and 74. The fast packet switch 70 communicates with the fast packet switch 72 via a transmission facility 76. Similarly, the fast packet switch 72 communicates with the fast packet switch 74 via a transmission facility 80.

The fast packet switch 70 provides three illustrated endpoints 82a, 82b, and 82c of the network. Similarly, the fast packet switch 72 provides two illustrated endpoints 82d and 82e, and the fast packet switch 74 provides three illustrated endpoints 82f, 82g, and 82h. Subscribers are interfaced to the endpoints 82a–82h of the network by a corresponding one of subscriber equipment 84a–84h. A connection management processor 86, which performs functions as earlier described, is coupled for communication with the fast packet switches 70, 72, and 74.

Suppose that the endpoint 82a has five virtual connections emanating therefrom, one virtual connection to each of endpoints 82d–82h (i.e., 82a to 82d, 82a to 82e, 82a to 82f, 82a to 82g, and 82a to 82h). Further, suppose that endpoints 82b and 82c each has five virtual connections emanating therefrom in a similar manner. Consequently, a total of 15 virtual connections emanate from the fast packet switch 70. However, assuming that each of the endpoints 82a–82c can transmit to only one destination endpoint at a time, only three transmissions can take place at a time from the fast packet switch 70 via the transmission facility 76.

Using embodiments of the present invention, bandwidth use is monitored and enforced for each of the three source endpoints 82a–82c rather than for each of the 15 virtual connections. In terms of the bundling terminology: the five virtual connections from the endpoint 82a are considered as a first bundle; the five virtual connections from the endpoint 82b are considered as a second bundle; and the five virtual connections from the endpoint 82c are considered as a third bundle. As a result, less bandwidth needs to be allocated in the transmission facility 76 to provide the 15 virtual connections in three bundles, in comparison to having 15 provisioned virtual connections each having bandwidth associated therewith.

Embodiments of the present invention are further illustrated in terms of a virtual private network, which is to be implemented for a plurality of subscribers. First, the network is provisioned with virtual connections between all subscriber endpoints. This consists of writing data into all the fast packet switches associating addresses and bandwidth parameters with all the virtual connections. This is performed by the network managers. When a transmission of information is to be made from a first subscriber to a second subscriber, the first subscriber packetizes the information, and includes the proper address field in a header of each packet. For two-way communications, the second subscriber packetizes its information to be sent to the first subscriber, and includes the proper address field in the header of each packet. The proper address field can be found by the subscriber in the following two ways.

In a first method, a table is provisioned in each piece of subscriber equipment by the network manager at network provisioning time. The table in each subscriber equipment contains the address of each other subscriber, and associated with it, the address field to be used to communicate between the subscriber and any of the other subscribers.

In a second method, all of the subscribers are provisioned a virtual connection to communicate to a common database, which acts as a name server. If a first subscriber wishes to communicate with a second subscriber, the first subscriber sends a packet to the database to query which VCIL to use in the address field of packets to be transmitted to the second subscriber. The database responds with a query packet containing the address of both the first subscriber and the second subscriber. The database communicates, to the first subscriber, the VCIL to be used for both ways of two-way communications between the first subscriber and the second subscriber. Thereafter, the first subscriber may send a control packet to the second subscriber to tell of his/her intent to begin communication as well as the VCIL to use on a return path.

The following examples pertain to embodiments of the present invention for use in ATM applications. Hereinafter, methods and systems for bandwidth management in ATM applications in accordance with the present invention are referred to as BABM (bundled ATM bandwidth management).

Figure 6:
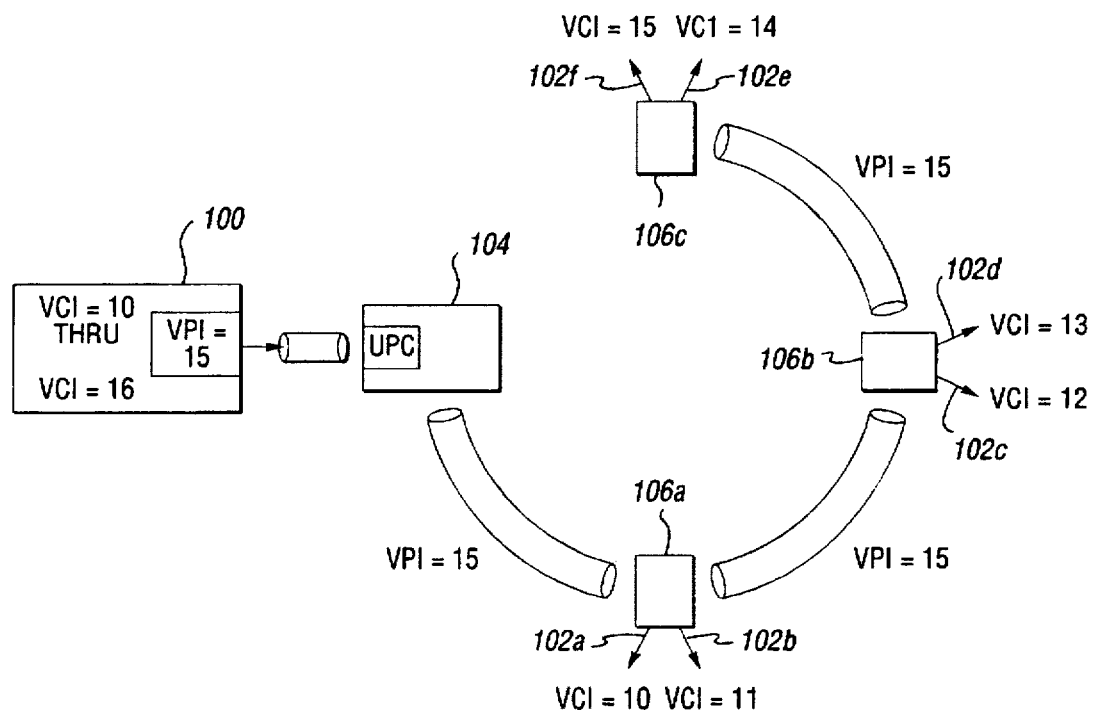
FIG. 6 is a schematic block diagram of an embodiment of a ring network in accordance with embodiments of the present invention.

FIG. 6 illustrates a ring network configuration similar to networks currently deployed in a local exchange carrier (LEC). The network virtually connects a source terminal 100 to six destination locations 102a–102f. In practice, the source terminal 100 may be an information server, a network element such as a private branch exchange, or a customer premises equipment. The network includes a fast packet switch 104 which is responsive to cells transmitted by the source terminal 100. The fast packet switch 104 is capable of performing a user parameter control (UPC) function on a bundle comprised of the six virtual connections. The UPC function is performed to check that the traffic conforms to contracted parameters. In general, each bundle is defined by a unique VPI value. The network further includes three cross-connect switches 106a–106c used for dropping off each cell at a desired one of the destination locations 102a–102f based on a VPI/VCI combination in the header of the cell.

If one wanted to establish bidirectional transmission capabilities, i.e. including transmissions from the six destinations 102a–102f to the source terminal 100, similar unidirectional bundles of virtual connections must be established.

In a first illustrative example, the source terminal 100 is an Ethernet adaptor used as a public network gateway from a private business location. The Ethernet adaptor adapts Ethernet traffic to ATM for public network connection to the six destination locations 102a–102f, which may represent six other business locations. The six destinations 102a–102f are identified by six VCIs ranging from 10 to 15. All connections are bundled in a virtual path identified by VPI=15.

The VPI is provisioned to be accessible to all nodes in the network with 10 Mb/s of bandwidth peak rate allocated thereto. Peak rate allocation means that the average bandwidth and the peak bandwidth on the VPI are the same and are both set to 10 Mb/s in this case. Since the peak and average are the same, the network is in essence set up for a Constant Bit Rate (CBR) service of 10 Mb/s on the VPI. Though the Ethernet source may in fact exhibit burstiness by sending 10 Mb/s some of the time and less than 10 Mb/s at other times, sending less will not affect service quality as long as 10 Mb/s is allocated. CBR service is a well behaved traffic type and low cell loss probability can be easily guaranteed for the VPI.

Each of the six bundled virtual connections identified by the VCIs may have an average bandwidth that is much less than 10 Mb/s but may transmit arbitrary length bursts at a peak rate of 10 Mb/s, one at a time. The source may be busy to one destination (one VCI) 90% of the time and to the other six 10% of the time. The source may transmit very long bursts to one destination and shorter ones to the other five. These traffic characteristics may change daily, hourly or by the minute. In bundling the traffic in one VPI, the characteristics of the individual VCIs do not matter as long as their aggregate is less than 10 Mb/s.

Consider and contrast this to the single connection management methods. Though the aggregate traffic on an Ethernet is known to be bandwidth limited to 10 Mb/s, how the bandwidth is divided among destination addresses is generally unknown. Using single connection management, these traffic characteristics must be known to engineer the network efficiently for Variable Bit Rate (VBR) traffic because each VCI must be allocated some bandwidth. Even if the traffic characteristics were known, the burstiness may exceed the capabilities of the ATM network or the traffic patterns may change dynamically and efficient operation of the network may not be possible with low cell loss probabilities. To achieve similar performance to the bundled ATM bandwidth management technique, each VCI using single connection management must be allocated 10 Mb/s. Only this allocation will allow the Ethernet to burst at the full 10 Mb/s at an arbitrary time to any of the destinations. Consequently, fewer bandwidth resources are needed using the bundled technique.

In a second illustrative example, a CBR application is considered. Suppose the source terminal 100 is a private branch exchange trunk interface which generates one Erlang of traffic, and is permanently virtually connected to the six destinations 102a–102f, each of which is a PBX. Using BABM, the bandwidth allocated for a single bundle or VPI is that of a single voice termination, or 64 kb/s. Neither the network bandwidth allocation or the connections need to change to allow the trunk to communicate to any of the destination PBXs. Separate trunks are not needed to all destinations; the CBR bandwidth of the trunk, or bundle, is shared while virtual connections exist to all destinations. It is noted that the bundle of connections illustrated are unidirectional from the source terminal 100 to the destinations 102a–102f. As such, similar bundles are needed from the other six PBXs to implement full duplex trunks between all endpoints.

Embodiments of BABM are also applicable to network topologies other than a ring. In a generalized mesh network, the bandwidth allocated on a bundle between a pair of VP/VC (virtual path/virtual channel) cross-connect nodes is no more than the amount of bandwidth the source associated with the bundle can generate, independent of the number of nodes yet to be traversed or final endpoints addressed by the individual virtual connections in the bundle.

Embodiments of the present invention impact procedures for bandwidth management in ATM. Bandwidth in a BABM bundle is carried unidirectionally. Bundles are defined from all of the endpoints to implement full duplex connections. A code or bit in the ATM header may be used to indicate the BABM routing mode while still supporting the current standard ATM capabilities. The code may come from a payload-type field or a bit from the GFC field.

Embodiments of the present invention take advantage of the virtual connection concept to save network bandwidth resources used while treating the source as a CBR, or peak rate allocated source. BABM does not preclude VBR bandwidth allocation on the bundle to further improve network bandwidth efficiency if an individual source is not 100% busy.

BABM routing saves resources on a shared network, such as the above-described ring topology embodiment. Of course, blocking can occur on the output drop if more than one source attempts to transmit to the same destination at the same time. A network output blocking analysis is performed in the following section.

Network Output Blocking Analysis

The bandwidth resources from each input to the network is the maximum amount generated by the source, denoted by b. On the transmission facilities between fast packet switches, bandwidth resources are allocated for a bundle which is also the maximum amount generated by the source associated with the bundle. At the final endpoint or output of the network, herein referred to as a drop, the bandwidth resource requirements can be engineered in two ways:

(i) avoid blocking at termination point using end-end signaling capabilities, or (ii) engineer the output bandwidth capacity using Knockout switch principles.

The mechanism described by (i) is explained with the previously described example of the PBXs connected with a 1 Erlang trunk to all the others on the ring. Signaling is supported strictly between the PBXs and does not terminate in the ring network shown; the ring only supports permanent virtual circuits. In this example, the terminating PBXs could signal to a call originating PBX if bandwidth resources on the terminating side drop are used up. In this way, the bandwidth resources on the terminating drop, i.e. the network endpoint at the destination end, can be decoupled from the number of virtual channels terminating at the network endpoint. In the example with seven PBXs all fully connected, six unidirectional VCIs terminate at each PBX. However, the PBX may have allocated bandwidth to only terminate three channels at a time and will signal back to an originating PBX to block a fourth originating call. Once blocked, the PBX with the fourth originating call would not send information on the VCI because the bandwidth is not allocated, even though the VCI label is permanently set up.

In the example of seven Ethernets fully interconnected using BABM routing, up to six Ethernets could send a burst or block of data to a single terminating Ethernet at the same time. Since this is a connectionless application, sources cannot be blocked with signaling. However, six Ethernets sending at 10 Mb/s can collectively only send 60 Mb/s, so the terminating drop could allocate this amount of traffic to the Ethernet bridging application. An ATM OC-3 running at 150 Mb/s can terminate this amount on the destination drop with plenty of bandwidth left for other applications, and the Ethernet bridging service for six Ethernets would be non-blocking.

As the number of interconnected Ethernets increases and approaches infinity, the drop bandwidth allocation could be engineered for a given blocking or cell overflow probability using Knockout switch principles. The Knockout switch is a non-blocking switch which allows multiple sources to transmit to single output simultaneously. The PVC network using BABM routing is non-blocking up to the destination drop point where the destination drop can be engineered to accept multiple bursts simultaneously. The Knockout switch bandwidth engineering has been analyzed for both uniform and non-uniform traffic. For uniform traffic with variable length bursts, one can use the Erlang B formula. For n→∞ sources transmitting uniformly to all the destinations with bursts of bandwidth b, the probability that a single destination receives more bandwidth than mb is given by the Erlang B formula:

$$Pr(\text{bandwidth} > mb) = \frac{\frac{\rho^m}{m!}}{\sum_{k=0}^{m} \frac{\rho^k}{k!}}$$

where ρ is the average utilization of the output as a fraction of the bandwidth b. The probabilities are tabulated in K. Y. Eng, M. G. Hluchyj and Y. S. Yeh, "A Knockout Switch For Variable Length Packets", IEEE JSAC, Vol. SAC-5 No. 9, December 1987, pp. 1274-1283.

Using this equation one finds, for example, with an arbitrarily large number of bridged Ethernets all transmitting at 10 Mb/s uniformly to each other (i.e. ρ=1), that the probability of the bandwidth on a terminating drop exceeding 90 Mb/s is less than $10^{-6}$. For each increase of the output bandwidth capacity by a unit of b, the probability of overflowing the capacity decreases by an order of magnitude. Thus, adding 10 Mb/s more to the output drop allocation (90+10=100 Mb/s) will decrease the probability of bandwidth exceeding the drop allocation to $10^{-7}$.

Instantaneous bandwidth overflow on the drop does not necessarily imply cell losses since the ATM network element has buffering. However, if the bandwidth on the drop has overflowed, the buffer now is used in proportion to the burst size and thus there is a greater probability of buffer overflow. In all instances where the drop bandwidth has not exceeded allocation, only cell level buffering can occur in the ATM switch and buffers can be engineered as if the traffic were CBR. Very few cell buffers are needed to make cell losses negligible with CBR traffic. With CBR engineering of switch buffers and network output drop bandwidth capacity engineering of mb, the probability that at least some cells of a burst are lost is bounded by the probability of the bandwidth capacity exceeding mb expressed in the Erlang B formula above.

Network traffic engineering for bursty data traffic is simplified using BABM for network routing, and Knockout switch principles and the Erlang B formula for the network output drop bandwidth allocation.

Routing Cost Analysis

Figure 7:
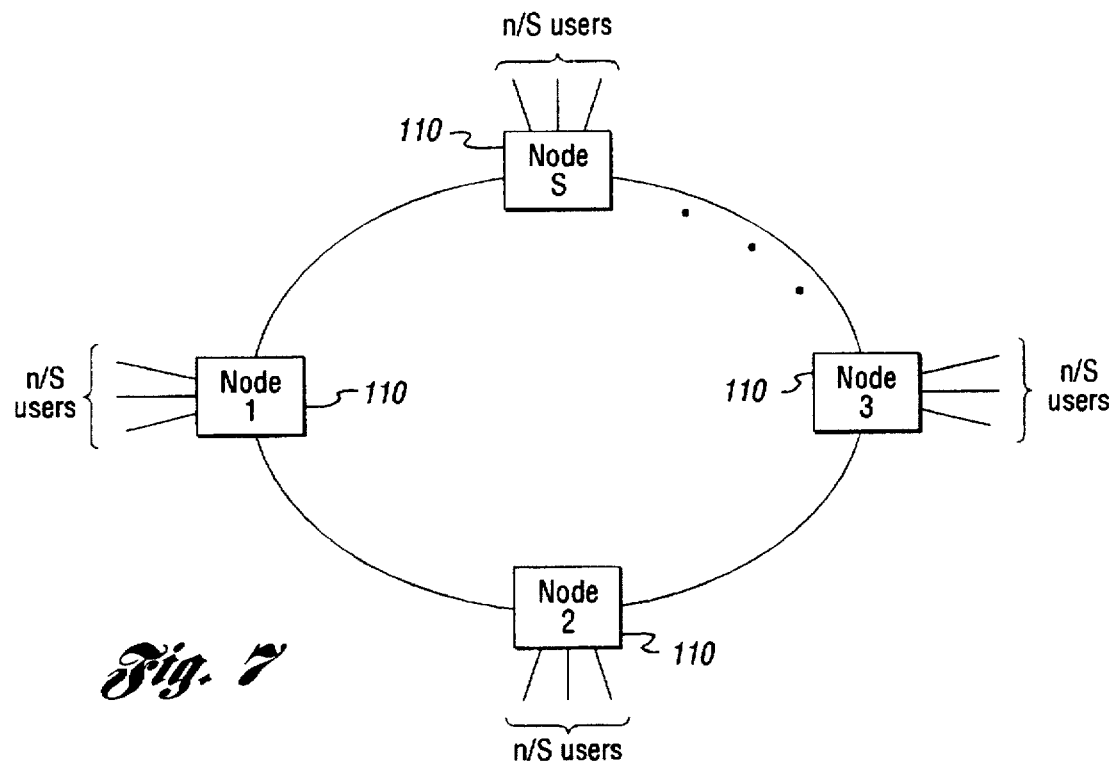
FIG. 7 is a block diagram of a ring network used for performing a routing cost analysis.

The routing cost of BABM if first compared to the cost of standard CBR ATM PVCs connecting n source-destination pairs. Since PVCs result in non-blocking performance, a non-blocking network configuration was used also to analyze the cost of SVC (switched virtual circuit) routing. All comparative costs are developed using S switch nodes 110 connected in a ring for illustrative purposes. FIG. 7 shows a ring which is a typical configuration for an LEC network, both in interoffice transport and local access. Development of costs for other network topologies that may contain other elements such as stars, rings and meshes in different application areas may be performed by those skilled in the art.

FIG. 7 illustrates a ring with S nodes 110 and n total users on all the nodes. The definition of a user in this example is very general: it may be a user of an enterprise network, a public network subscriber, or a trunk from a sub-network. A switch or sub-network managed by another enterprise is considered to be a user under this definition. Each user generates one Erlang of traffic, i.e. the user line is assumed 100% occupied. All users are connected to all other users with a duplex connection of bandwidth b. The comparative routing costs are illustrated by the cross-section bandwidth on the ring as a multiple of the bandwidth, b, generated from an individual source.

PVC Routing Costs With Single Connection Management

A transmission segment is defined as the transmission line between any pair of nodes on a ring. The number of transmission segments in the ring equals the number of switching nodes (S) on the ring. The cost of setting up full connectivity between all users is found using an equation for the number of transmission segments traversed by a unidirectional connection from a single source on a node to a single subscriber on each of the other nodes. This cost will be represented by $T_{seg}$.

Figure 8:
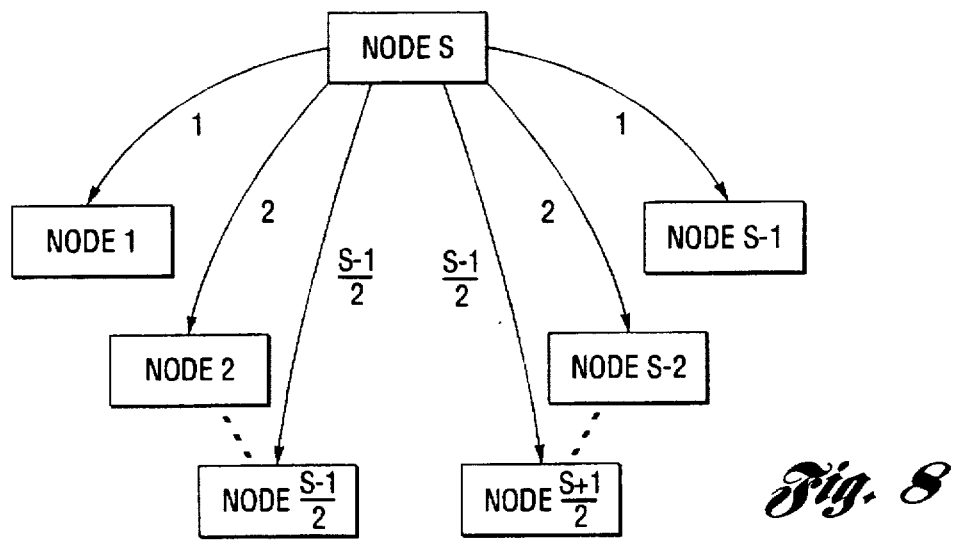
FIG. 8 is a block diagram illustrating connection costs measured in terms of transmission segments.

From FIG. 8 one can add up the segments used for a unidirectional connection from a single subscriber on Node S to a single subscriber on each of the other nodes, for the case of an odd number of nodes. To add up the connection costs measured in transmission segments, one can combine the terms associated with the longest connection with the shortest connection on the left side to produce:

$$\frac{S-1}{2} + 1 = \frac{S+1}{2}.$$

Adding up the second shortest connection with the second longest connection produces the same result. Similarly, one can add up the terms on the right side. Finally, any leftover (if the number of connections on each side of FIG. 8 is odd) mid-length connections on both sides are added together to yield the same term. The number of terms thus produced is:

$$\frac{S-1}{2}$$

Multiplying the terms by the magnitude of each term yields the number of transmission segments for the set of connections defined earlier in the case of an odd number of nodes:

$$T_{seg}^o = \left(\frac{S-1}{2}\right)\left(\frac{S+1}{2}\right)$$

$$T_{seg}^o = \frac{S^2-1}{4}.$$

In the case of an even number of switching nodes (S), one can add one additional node to FIG. 8 which has a distance of S/2 from the source node in the picture. To that cost, one must add the connections to the remaining switch nodes which are now odd and equal to S−1. Substituting this number of remaining nodes into the equation for the odd number of nodes and then adding in the single term for the extra even node most distant from the source node yields:

$$T^e_{seg} = \left( \frac{(S-1)^2 - 1}{2} \right) + \frac{S}{2}$$

$$T^e_{seg} = \frac{S^2}{4}.$$

These equations represent the cost of the unidirectional connections from a single subscriber on a node to a single subscriber on every other node as measured in transmission segments used on the ring. One must multiply this results with n/S to get unidirectional connections from a single subscriber to all of n/S subscribers on each node. To obtain bidirectional connections from all subscribers to all others subscribers, one multiplies by the number of subscribers n to yield the total number of segment connections.

Finally, to get the cost measured as a cross-section bandwidth on a ring in multiples of the bandwidth on a single connection, the previous results are divided by the number of transmission segments S to yield the routing costs for rings with both odd and even number of nodes:

$$C^o_{PVC} = \frac{1}{4} n^2 \left( 1 - \frac{1}{S^2} \right)$$

$$C^e_{PVC} = \frac{1}{4} n^2$$

PVC Routing Costs Using Bundled ATM Bandwidth Management

Figure 9:
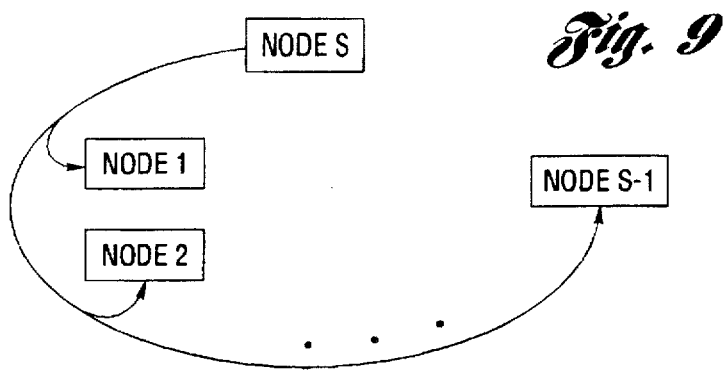
FIG. 9 is a block diagram illustrating the transmission segments used for a unidirectional bundle from a single subscriber to all other subscribers in a network.

FIG. 9 shows S−1 transmission segments used for a unidirectional bundle from a single subscriber at node S to all other subscribers on all nodes. Since the bandwidth required for the bundle is a single unit of the source rate b, the cost in transmission segments is simply:

$$T_{seg} = S-1.$$

To add virtual drops to the existing bundled ATM connection, additional VCI labels are required, but no additional bandwidth resources associated with the connections in the bundle are required. Multiplication by n sources enables duplex connections between all subscribers. Finally, to get the cross-section bandwidth, a division by the number of segments (S) is required to get:

$$C_{BABM} = n \left( 1 - \frac{1}{S} \right).$$

SVC Routing Costs

In the SVC (switched virtual circuit) case, bandwidth is only allocated to a currently busy connection. Since one Erlang of traffic is assumed per user, all connections are assumed busy. To make sure that the SVC case is non-blocking like the PVC and BABM cases, the SVC routing cost is based on all connections using a worst case distance. The ring bandwidth used if all subscribers are busy and connected to subscribers on a corresponding most distant node can be easily derived for a ring with both odd and even numbers.

$$C^o_{SVC} = \frac{1}{2} n \left( 1 - \frac{1}{S} \right)$$

$$C^e_{SVC} = \frac{1}{2} n$$

Figure 10:
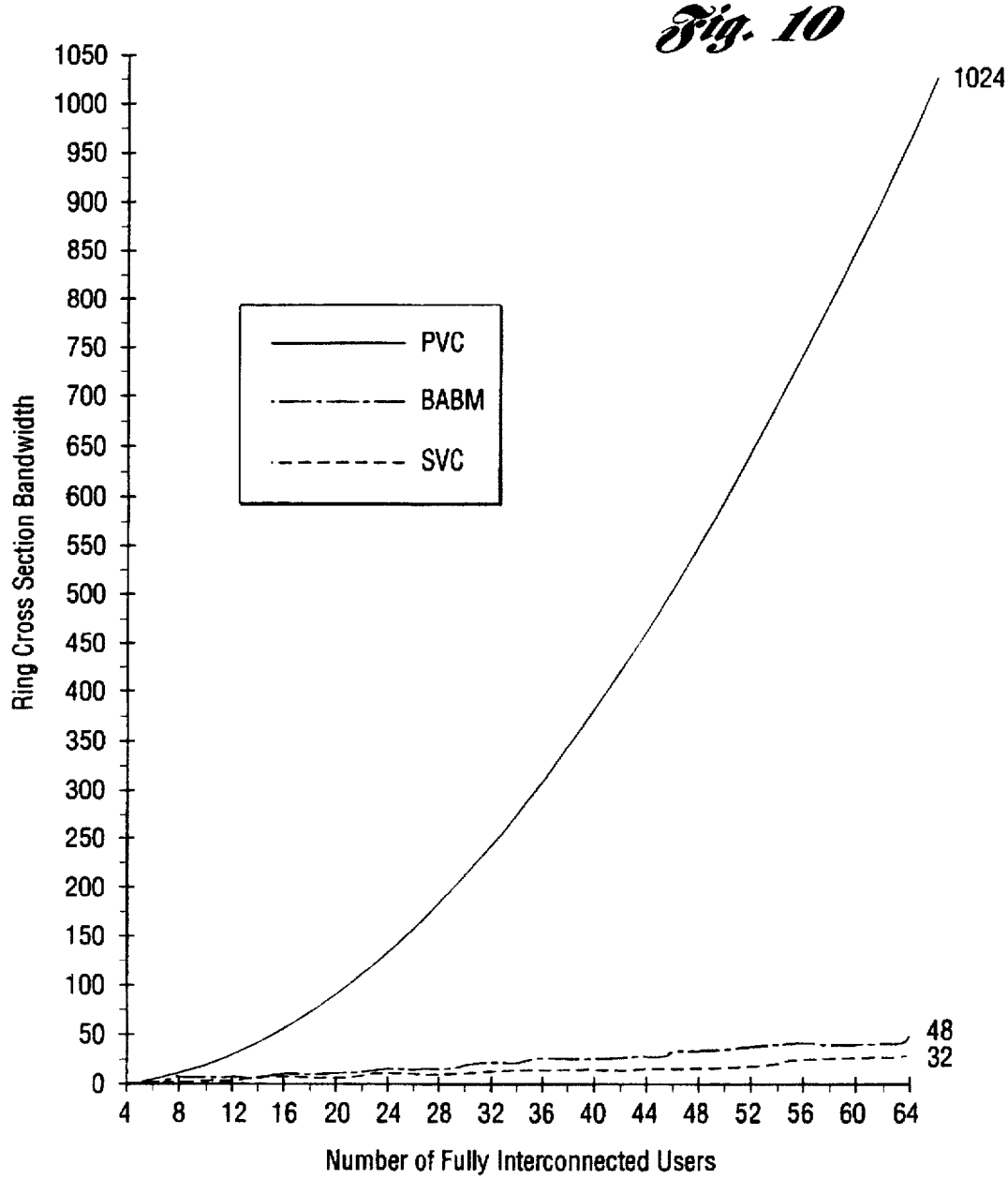
FIG. 10 is a graph of routing costs for an embodiment of the present invention compared with other materials.

Notice that the terms for PVC routing costs are proportional to $n^2$, while both the BABM and SVC methods use bandwidth in proportion to n. The results for various numbers of users (n) are plotted in FIG. 10 assuming four nodes each sharing an even number of users. The cross-section bandwidth allows bidirectional transmissions between any pair of users and is measured in multiples of the bandwidth generated by a single user. Although SVC based routing has slightly lower bandwidth requirements, it requires additional network complexity for call processing. In addition, SVCs are not efficiently usable for some applications—such as connectionless data services.

Addressing For BABM Applications

ATM is a connection oriented technology. Thus, VCI and VPI labels are defined to address connections. Though BABM does not allocate bandwidth to every connection in the bundle, VCI and VPI address labels are used for every connection. With $n^2$ connection complexity, connection labels can be limiting. If the VPI field is used to identify the bundle emanating from a source, and the VCI is used to address the destination drop, then the combination identifies a source-destination pair or a connection. The total number of symmetrical connections $C_{sym}$ supported by an ATM interface is a function of the number of VCI and VPI bits supported by a given manufacturer's ATM product as follows:

$$C_{sym} \leq \min(2^{B_{VCI}}, 2^{B_{VPI}}).$$

The min function denotes the smaller of the pair of numbers, and $B_{VCI}$ and $B_{VPI}$ denote the number of bits supported in the VCI and VPI fields, respectively. The ATM standard defines 8 bits for the VPI and 16 bits for the VCI on the user network interface. A fully supported interface would therefore allow 256 symmetrical connections such as might be required by a LAN bridging application.

Consider an ATM based PVC network for video distribution in a metropolitan area. A 150 Mbit ATM link can support no more than 50 MPEG (Motion Pictures Experts Group) movies simultaneously using 3 Mb/s per movie. A Video Service Provider thus needs 50 VPI's on a 150 Mbit ATM link for access into the network, which is within the 256 provided by the ATM user network interface. With the 16 VCI bits associated with each VPI, 64,000 drops or customers can be addressed by each movie. The number of asymmetrical connections $C_{asym}$ supported by the ATM VCI/VPI address space is well matched for video distribution and can be modeled by:

$$C_{asym} \leq \max(2^{B_{VCI}}, 2^{B_{VPI}}).$$

The above-described embodiments of the present invention have many advantages. The proposed Bundled ATM Bandwidth Management (BABM) technique permits PVC interconnection of n endpoints with network bandwidth complexity O(n). The number of endpoints can be as high as 64,000 in asymmetrical applications such as video distribution. It approaches the "pay for use" bandwidth savings associated with SVC, without the complexity of signaling and call processing. It is therefore a possible substitute for SVC based networks for some applications and in some early timeframes.

The BABM technique also permits the interconnection of bursty data sources for such applications as connectionless data. The technique allows for network bandwidth savings using the ATM virtual connection concept with simple CBR-like bandwidth management in the network, and the application of traditional Erlang B tables for network output drop bandwidth management. Furthermore, the BABM bandwidth management techniques can be independent of source burstiness. In this case, unlike VBR service, where both bandwidth and ATM queue sizes must be engineered for VBR burst characteristics, BABM only requires bandwidth engineering. ATM network element queue engineering is well known as is simple CBR service queue engineering.

Consider a customer who has a plurality of virtual connections provisioned from an endpoint of a fast packet switching network to a plurality of destination endpoints, wherein the fast packet switching network manages bandwidth resources in accordance with embodiments of the present invention. In order to avoid a discarding of packets by the network, it is beneficial for the customer to control the flow of packets being forwarded to the endpoint. Embodiments of methods and systems for controlling the flow of packets presented to the network are described next.

Figure 11:
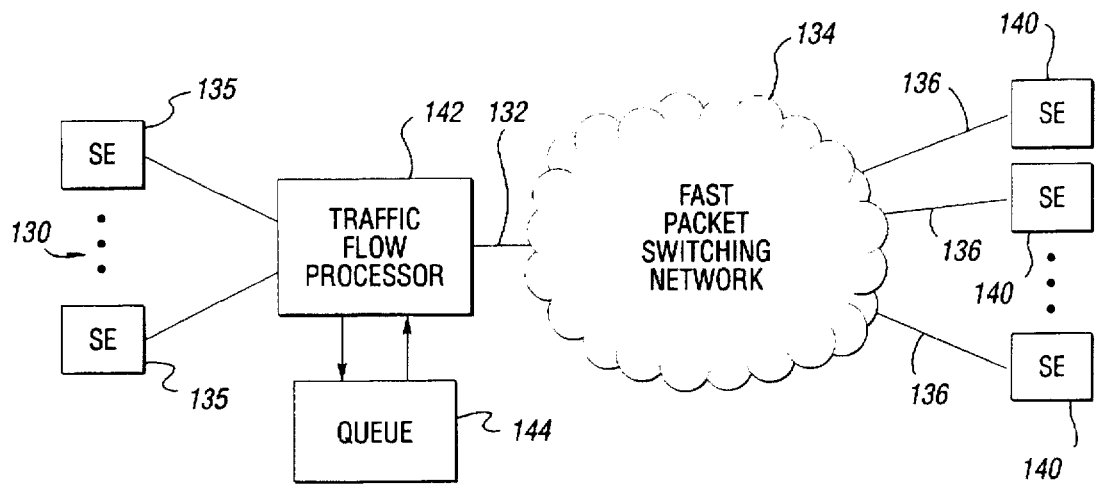
FIG. 11 is a block diagram of an embodiment of a system for controlling a flow of packets being forwarded by a customer premises equipment to an endpoint of a fast packet switching network.

FIG. 11 is a block diagram of an embodiment of a system for controlling a flow of packets being forwarded by customer premises equipment (CPE), generally indicated by reference numeral 130, to an endpoint 132 of a fast packet switching network 134. The customer premises equipment 130 includes one or more types of subscriber equipment 135 in communication with the network 134. The fast packet switching network 134 has a plurality of virtual connections provisioned from the endpoint 132 to a plurality of destination endpoints 136. The virtual connections are utilized by the customer for communicating packets from the customer premises equipment 130 to subscriber equipment 140 at one or more of the destination endpoints.

The system includes a traffic flow processor 142 operatively associated with the customer premises equipment 130 and the network 134. The traffic flow processor 142 provides means for obtaining at least one parameter indicative of bandwidth usage associated with the endpoint 132 over at least two of the virtual connections. The at least one parameter indicative of bandwidth usage provides a measure of the bandwidth associated with a bundle of provisioned virtual connections, the bundle consisting of the at least two of the virtual connections.

The at least one parameter parallels at least one of the bandwidth parameters monitored and enforced by the network 134 in accordance with a predetermined traffic contract. Preferably, the traffic flow processor 142 obtains each of the parameters which are monitored by the network 134 in accordance with the predetermined traffic contract. The at least one parameter may be indicative of an average bit rate or a peak bit rate, for example, associated with the bundle. The at least one parameter may include a leaky bucket parameter as described earlier.

The traffic flow processor 142 further provides means for inhibiting the flow of packets forwarded to the endpoint 132 when the at least one parameter violates the traffic contract. Typically, this occurs when one of the at least one parameter violates a predetermined threshold. The predetermined threshold may be violated if the parameter exceeds the threshold, or alternatively, if the parameter drops below the threshold.

The system further includes a queue 144 in communication with the traffic flow processor 142. The queue 144 provides means for storing at least one packet when the traffic contract is violated, i.e. when the parameter violates the predetermined threshold. Preferably, the queue 144 queues all incoming packets from the customer premises equipment 130 for traffic shaping by the traffic flow processor 142.

The traffic flow processor 142 periodically updates the at least one parameter in accordance with a leaky bucket algorithm. Typically, the leaky bucket parameter is decremented at periodic intervals.

When the at least one parameter complies with the predetermined traffic contract, i.e., each parameter complies with a corresponding predetermined threshold, the traffic flow processor 142 performs a step of forwarding one of the at least one packet stored in the queue 144 to the endpoint 132. The traffic flow processor 142 further updates each of the at least one parameter when the packet is forwarded to the endpoint 132. Typically, the leaky bucket parameter is updated by performing a step of incrementing the parameter.

As a result, the traffic flow processor 142 forwards a packet to the endpoint 132 only if the packet does not violate the predetermined contract. Furthermore, as long as the predetermined traffic contract is not violated, the traffic flow processor 142 is capable of rapidly forwarding packets to the endpoint 132. Consequently, the traffic flow processor 142 expeditiously forwards packets to the endpoint 132 in an manner which complies with the predetermined traffic contract.

Figure 12:
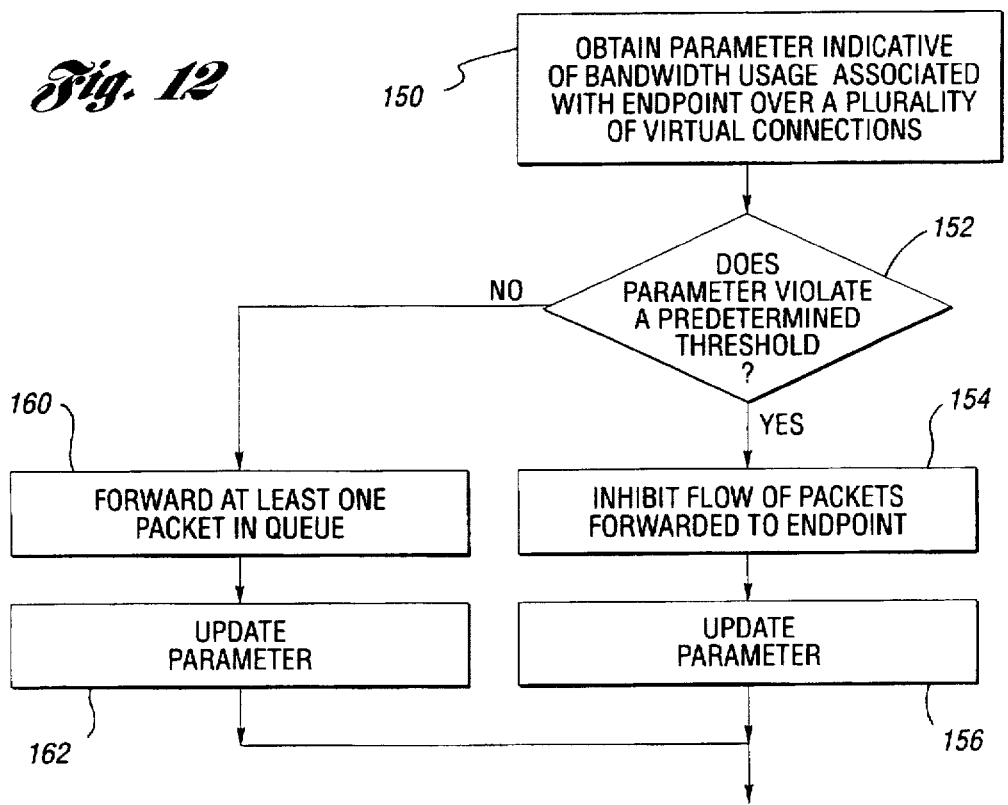
FIG. 12 is a flow chart of an embodiment of a method of controlling a flow of packets being forwarded by a customer premises equipment to an endpoint of a fast packet switching network.

FIG. 12 is a flow chart of an embodiment of a method of controlling a flow of packets being forwarded by a customer premises equipment to an endpoint of a fast packet switching network. The fast packet switching network has a plurality of virtual connections provisioned from the endpoint to a plurality of destination endpoints, wherein the virtual connections are utilized for communicating the packets to the destination endpoints. The packets provided by the customer premises equipment are stored in a queue, and presented to the endpoint in accordance with the following method.

As indicated by block 150, the method includes a step of obtaining a parameter indicative of bandwidth usage associated with the endpoint over at least two of the virtual connections. The parameter provides a measure of bandwidth usage associated with a bundle of provisioned virtual connections which include the at least two of the virtual connections. As previously mentioned, the parameter may be a measure of average bit rate or peak bit rate, and may be computed using a leaky bucket algorithm.

If the parameter violates a predetermined threshold specified by a predetermined traffic contract, as determined by block 152, a step of inhibiting the flow of packets being forwarded to the endpoint is performed, as indicated by block 154. Consequently, when the flow is inhibited, the number of packets stored in the queue increases as further packets are provided by the customer premises equipment.

A step of updating the parameter is performed, as indicated by block 156, when the flow is inhibited. If a leaky bucket parameter is employed, the parameter is decremented at periodic intervals. As a result, when the flow of packets is inhibited, the parameter is repeatedly reduced until a time when the parameter no longer violates the traffic contract.

If the parameter does not violate the predetermined threshold, i.e., if the parameter complies with the predetermined threshold as determined by block 152, a step of forwarding one of the at least one packet in the queue is performed, as indicated by block 160. A step of updating the parameter when the packet is forwarded to the endpoint from the customer premise equipment is performed, as indicated by block 162. If a leaky bucket parameter is employed, the parameter is incremented in response to the packet being forwarded to the endpoint. Further, the parameter may be decremented in accordance with a step of decrementing the parameter at periodic intervals.

By repeated executing the above-described series of steps, packets stored within the queue are successively forwarded to the endpoint until it is deemed that forwarding of a subsequent packet is in violation of the predetermined traffic contract. At this point, the length of the queue begins to grow as further packets are provided by the CPE. The bandwidth parameter is repeatedly updated until a time when the parameter no longer violates the traffic contract. At this time, the subsequent packet (along with other packets in compliance with the contract) is forwarded to the endpoint.

The above-described embodiments of methods and systems for controlling a flow of packets forwarded by a CPE to an endpoint of a fast packet switching network have many advantages. By utilizing a mirror image of the usage parameter control (UPC) algorithm within a traffic flow processor, the performance of the overall system (comprised of the network and the CPE) is improved in that packets are not dropped unnecessarily. The above-described embodiments are particularly well-suited for the BABM methods and systems described herein, wherein the packets are asynchronous transfer mode cells.

While the best modes for carrying out the invention have been described in detail, those familiar with the art to which this invention relates will recognize various alternative designs and embodiments for practicing the invention as defined by the following claims.

What is claimed is:

1. A method of controlling a flow of packets being forwarded by a customer premise equipment to a source endpoint of a fast packet switching network, the fast packet switching network having a plurality of virtual connections provisioned from the source endpoint to a plurality of destination endpoints, the virtual connections utilized for communicating the packets to the destination endpoints, the method comprising the steps of:

bundling the plurality of virtual connections together for the assignment of bandwidth;

obtaining a bandwidth constraint associated with the source endpoint over all of the plurality of virtual connections, wherein the bandwidth constraint is independent of the destination endpoint as identified by a virtual connection;

obtaining a parameter indicative of actual bandwidth usage associated with the source endpoint over the bundle of virtual connections emanating from the source endpoint; and inhibiting the flow of packets forwarded to the source endpoint when the parameter violates the bandwidth constraint.

2. The method of claim 1 further comprising the steps of:

queuing at least one packet when the parameter violates a predetermined threshold; and forwarding one of the at least one packet to the endpoint when the parameter complies with the predetermined threshold.

3. The method of claim 1 further comprising the step of updating the parameter when a packet is forwarded to the endpoint by the customer premise equipment.

4. The method of claim 3 wherein the parameter is incremented when the packet is forwarded to the endpoint.

5. The method of claim 1 further comprising a step of updating the parameter at periodic intervals.

6. The method of claim 5 wherein the parameter is decremented at the periodic intervals.

7. The method of claim 1 wherein the packets are asynchronous transfer mode cells.

8. A method of controlling a flow of asynchronous transfer mode cells being forwarded by a customer premise equipment to a source endpoint of a fast packet switching network, the fast packet switching network having a plurality of virtual connections provisioned from the source endpoint to a plurality of destination endpoints, the virtual connections utilized for communicating the cells to the destination endpoints, the method comprising the steps of:

bundling the plurality of virtual connections together for the assignment of bandwidth;

obtaining a bandwidth constraint associated with the source endpoint over all of the plurality of virtual connections, wherein the bandwidth constraint is independent of the destination endpoint as identified by a virtual connection;

obtaining a parameter indicative of actual bandwidth usage associated with the source endpoint over the bundle of virtual connections emanating from the source endpoint;

updating the parameter in response to the customer premise equipment forwarding a cell to the source endpoint;

inhibiting the flow of cells forwarded to the source endpoint when the parameter violates the bandwidth constraint;

queuing at least one cell when the parameter violates the bandwidth constraint; and forwarding one of the at least one cell to the source endpoint when the parameter complies with the bandwidth constraint.

9. A system for controlling a flow of packets being forwarded by a customer premise equipment to a source endpoint of a fast packet switching network, the fast packet switching network having a plurality of virtual connections provisioned from the source endpoint to a plurality of destination endpoints, the virtual connections utilized for communicating the packets to the destination endpoints, the system comprising:

means for bundling the plurality of virtual connections together for the assignment of bandwidth;

means for obtaining a bandwidth constraint associated with the source endpoint over all of the plurality of virtual connections, wherein the bandwidth constraint is independent of the destination endpoint as identified by a virtual connection;

means for obtaining a parameter indicative of actual bandwidth usage associated with the source endpoint over the bundle of virtual connections emanating from the source endpoint; and means for inhibiting the flow of packets forwarded to the source endpoint when the parameter violates the bandwidth constraint.

10. The system of claim 9 further comprising:

means for storing at least one packet in a queue when the parameter violates a predetermined threshold; and means for forwarding one of the at least one packet in the queue to the endpoint when the parameter complies with the predetermined threshold.

11. The system of claim 9 further comprising means for updating the parameter when a packet is forwarded to the endpoint by the customer premise equipment.

12. The system of claim 11 wherein the parameter is incremented when the packet is forwarded to the endpoint.

13. The system of claim 9 further comprising means for updating the parameter at periodic intervals.

14. The system of claim 13 wherein the parameter is decremented at the periodic intervals.

15. The system of claim 9 wherein the packets are asynchronous transfer mode cells.

16. A system for controlling a flow of asynchronous transfer mode cells being forwarded by a customer premise equipment to a source endpoint of a fast packet switching network, the fast packet switching network having a plurality of virtual connections provisioned from the source endpoint to a plurality of destination endpoints, the virtual connections utilized for communicating the cells to the destination endpoints, the system comprising:

means for bundling the plurality of virtual connections together for the assignment of bandwidth;

means for obtaining a bandwidth constraint associated with the source endpoint over all of the plurality of virtual connections, wherein the bandwidth constraint is independent of the destination endpoint as identified by a virtual connection;

means for obtaining a parameter indicative of actual bandwidth usage associated with the endpoint over the bundle of virtual connections emanating from the source endpoint;

means for updating the parameter in response to the customer premise equipment forwarding a cell to the source endpoint;

means for inhibiting the flow of cells forwarded to the source endpoint when the parameter violates bandwidth constraint;

means for queuing at least one cell when the parameter violates the bandwidth constraint; and means for forwarding one of the at least one cell to the source endpoint when the parameter complies with the bandwidth constraint.

* * * * *